(12) United States Patent
Richmond et al.

(10) Patent No.: US 9,280,898 B1
(45) Date of Patent: Mar. 8, 2016

(54) OBJECT DETECTION ASSEMBLY

(71) Applicants: Tony Richmond, Oakdale, LA (US);
Kelli Richmond, Oakdale, LA (US)

(72) Inventors: Tony Richmond, Oakdale, LA (US);
Kelli Richmond, Oakdale, LA (US)

( * ) Notice: Subject to any disclaimer, the term of this patent is extended or adjusted under 35 U.S.C. 154(b) by 51 days.

(21) Appl. No.: 14/146,765

(22) Filed: Jan. 3, 2014

(51) Int. Cl.
| | | |
|---|---|---|
| *B60Q 1/00* | (2006.01) | |
| *G08G 1/16* | (2006.01) | |
| *B60Q 9/00* | (2006.01) | |
| *G01S 13/88* | (2006.01) | |
| *G08B 13/24* | (2006.01) | |

(52) U.S. Cl.
CPC .............. *G08G 1/165* (2013.01); *B60Q 9/007* (2013.01); *G01S 13/885* (2013.01); *G08B 13/2445* (2013.01)

(58) Field of Classification Search
CPC ......... G01S 13/885; E02F 3/28; A01B 1/022; G01V 3/081; G08B 13/2445; G08B 13/2457; G06K 19/07749; G06K 19/07758; H01R 13/6658; H01R 13/6675
USPC .............. 340/435, 436, 540, 545.2; 414/685, 414/815, 694, 699; 342/22, 450–453, 342/457–460
See application file for complete search history.

(56) References Cited

U.S. PATENT DOCUMENTS

| | | | |
|---|---|---|---|
| 3,871,536 A | 3/1975 | Brown | |
| 3,886,755 A | 6/1975 | Lundin | |
| 4,600,356 A * | 7/1986 | Bridges et al. | ............... 414/694 |
| 5,991,013 A | 11/1999 | Eslambolchi et al. | |
| 6,344,803 B1 * | 2/2002 | Tsubouchi et al. | ........... 340/928 |
| 6,371,692 B1 | 4/2002 | Fatigati | |
| 6,377,872 B1 * | 4/2002 | Struckman | .................... 700/258 |
| 6,735,888 B2 | 5/2004 | Green et al. | |
| 7,150,116 B2 | 12/2006 | Barry | |
| 2011/0068936 A1 * | 3/2011 | Shimada et al. | .............. 340/584 |
| 2013/0071213 A1 * | 3/2013 | Allouche et al. | ............. 414/685 |

* cited by examiner

*Primary Examiner* — Hoi Lau

(57) ABSTRACT

A object detection assembly for remotely sensing an underground object includes a mount that is operationally coupled to an excavator bucket. An upper plate is coupled to the mount. A transceiver is coupled to the upper plate. The transceiver may detect an object when the excavator bucket excavates Earth. The transceiver is operationally coupled to a vehicle. The transceiver alerts a driver of the vehicle to the presence of the object. A lower plate is coupled to the mount.

12 Claims, 6 Drawing Sheets

OBJECT DETECTION ASSEMBLY

BACKGROUND OF THE DISCLOSURE

Field of the Disclosure

The disclosure relates to object detection devices and more particularly pertains to a new object detection device for remotely sensing an underground object.

SUMMARY OF THE DISCLOSURE

An embodiment of the disclosure meets the needs presented above by generally comprising a mount that is operationally coupled to an excavator bucket. An upper plate is coupled to the mount. A transceiver is coupled to the upper plate. The transceiver may detect an object when the excavator bucket excavates Earth. The transceiver is operationally coupled to a vehicle. The transceiver alerts a driver of the vehicle to the presence of the object. A lower plate is coupled to the mount.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
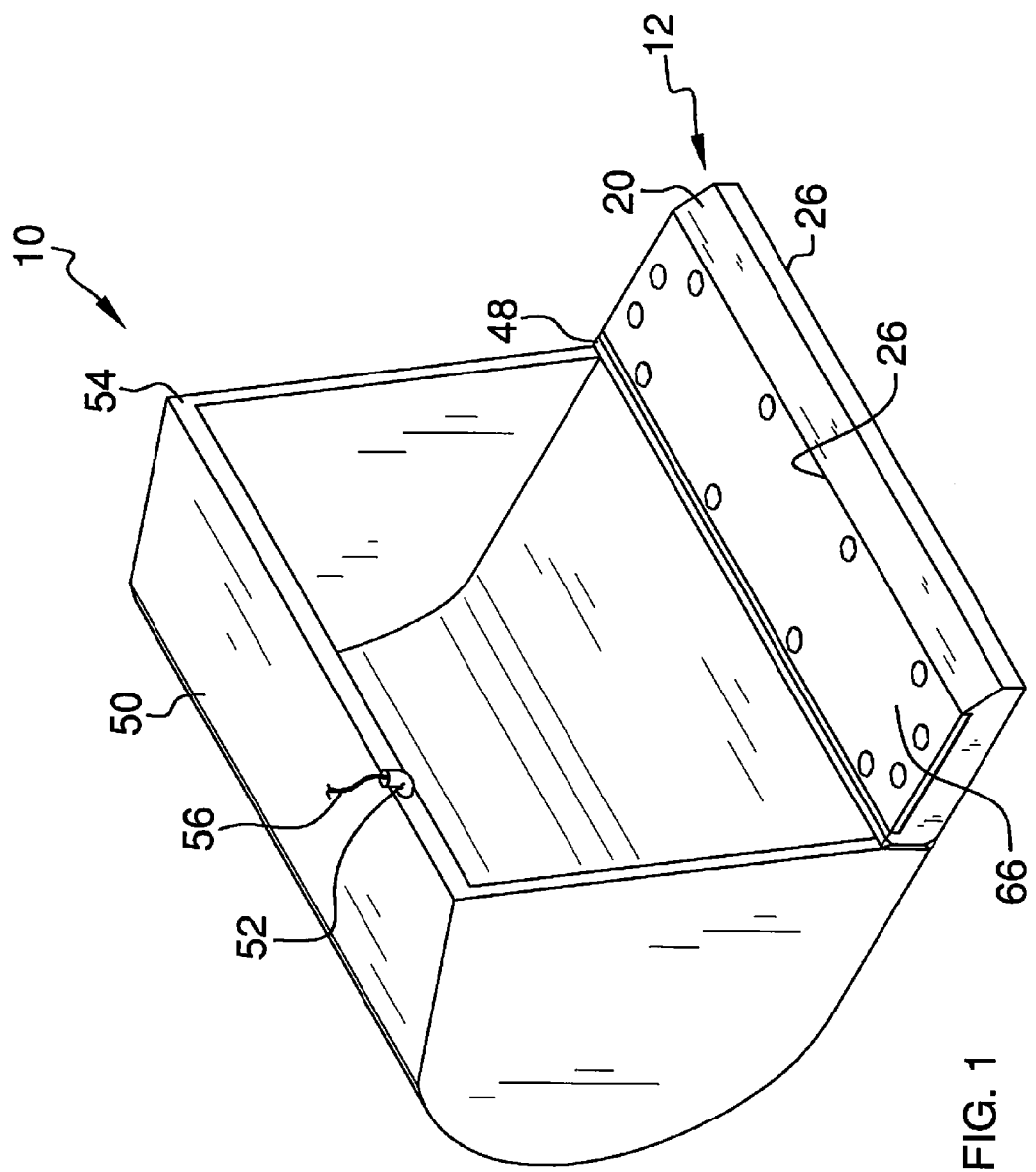
FIG. 1 is a perspective view of a object detection assembly according to an embodiment of the disclosure.
Figure 2:
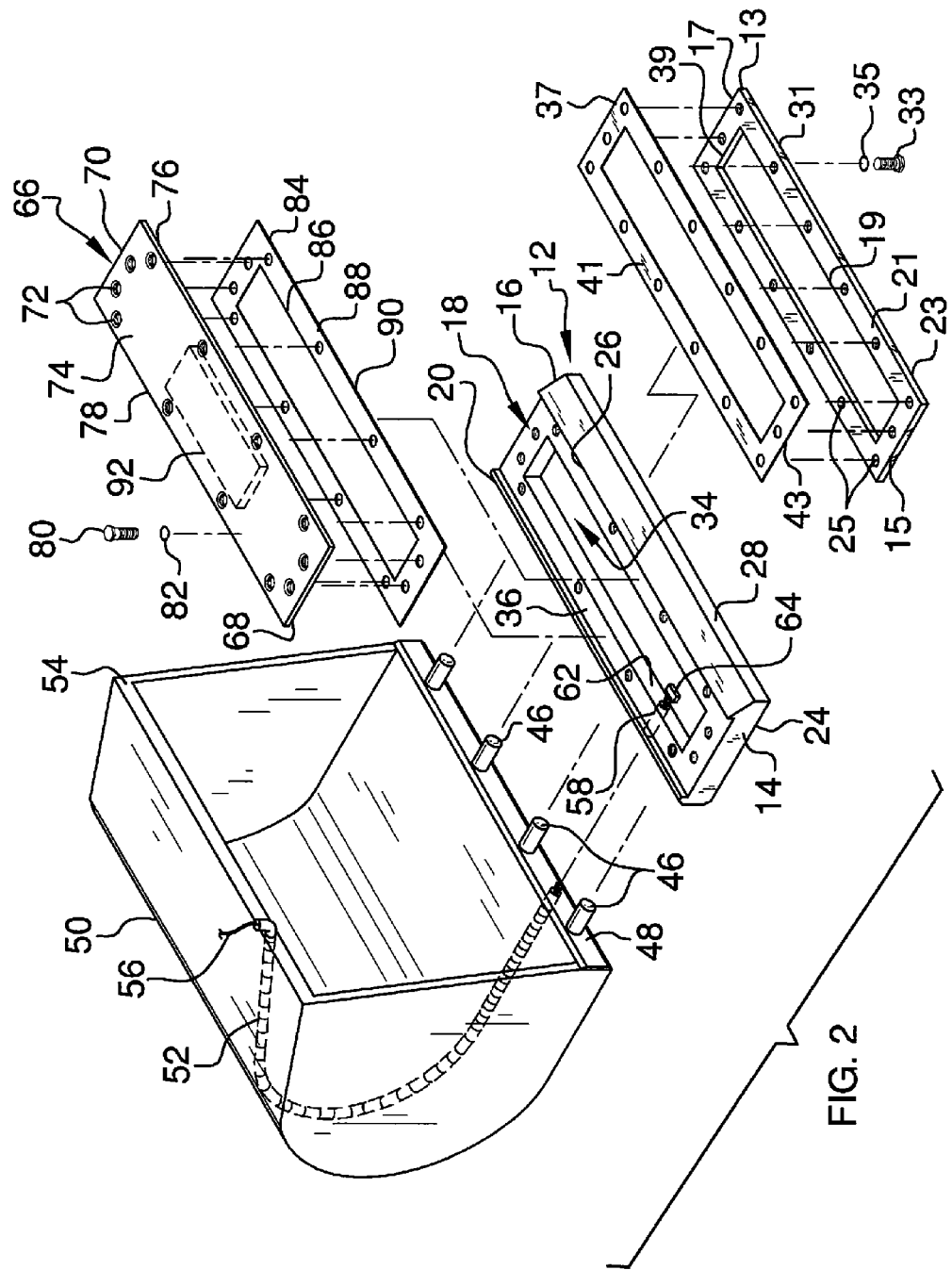
FIG. 2 is a top perspective view of an embodiment of the disclosure.
Figure 3:
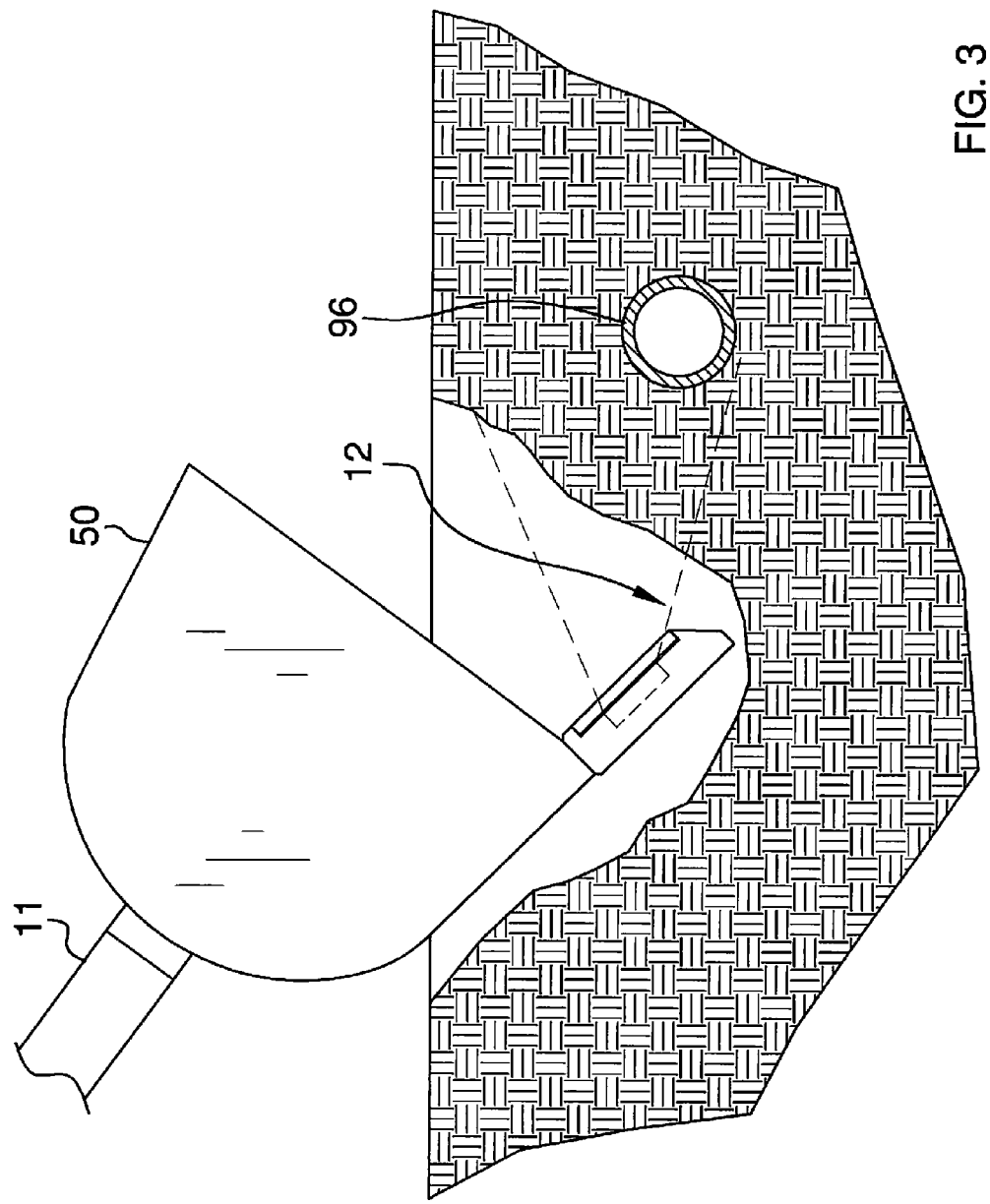
FIG. 3 is an in-use view of an embodiment of the disclosure.
Figure 4:
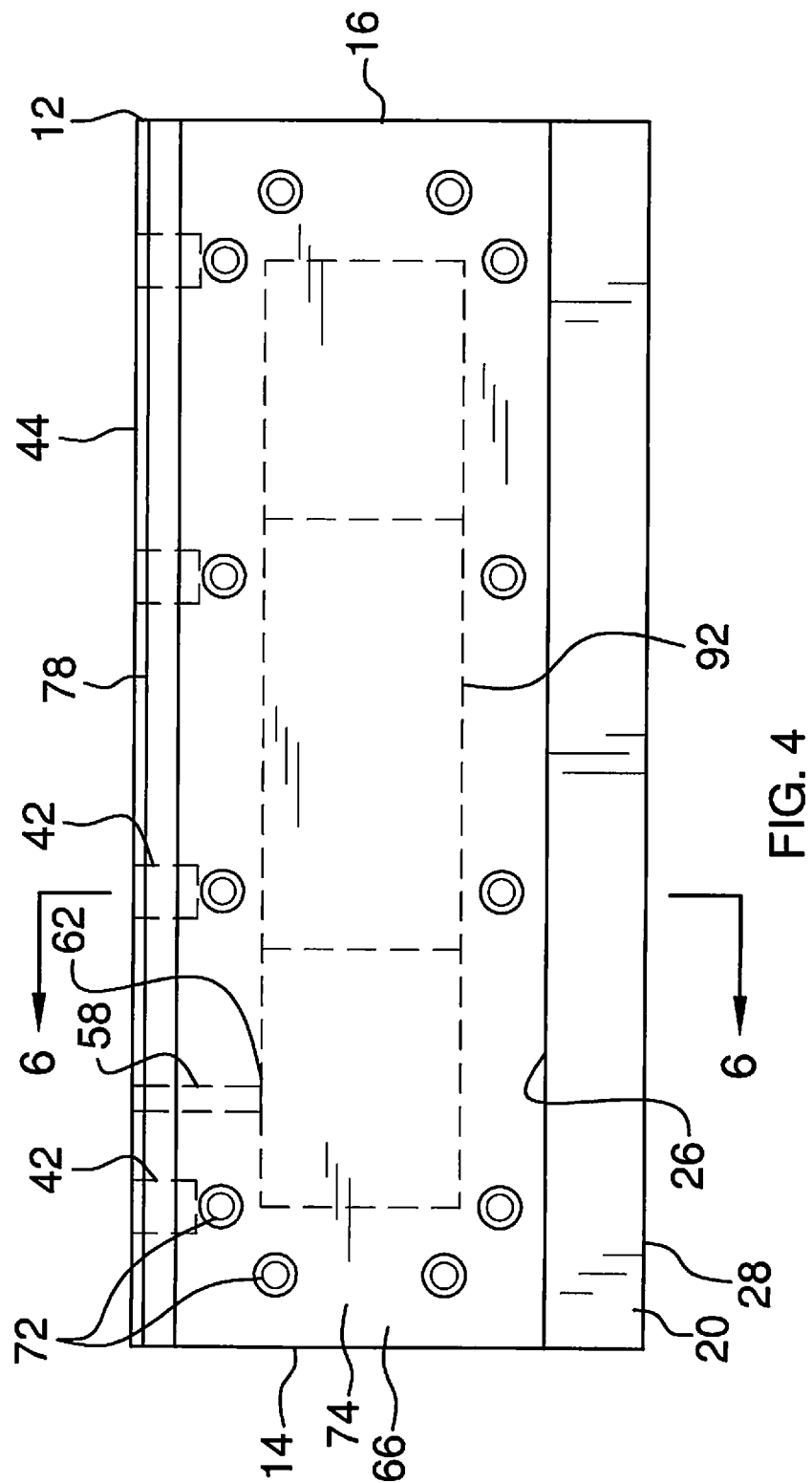
FIG. 4 is a top view of an embodiment of the disclosure.
Figure 5:
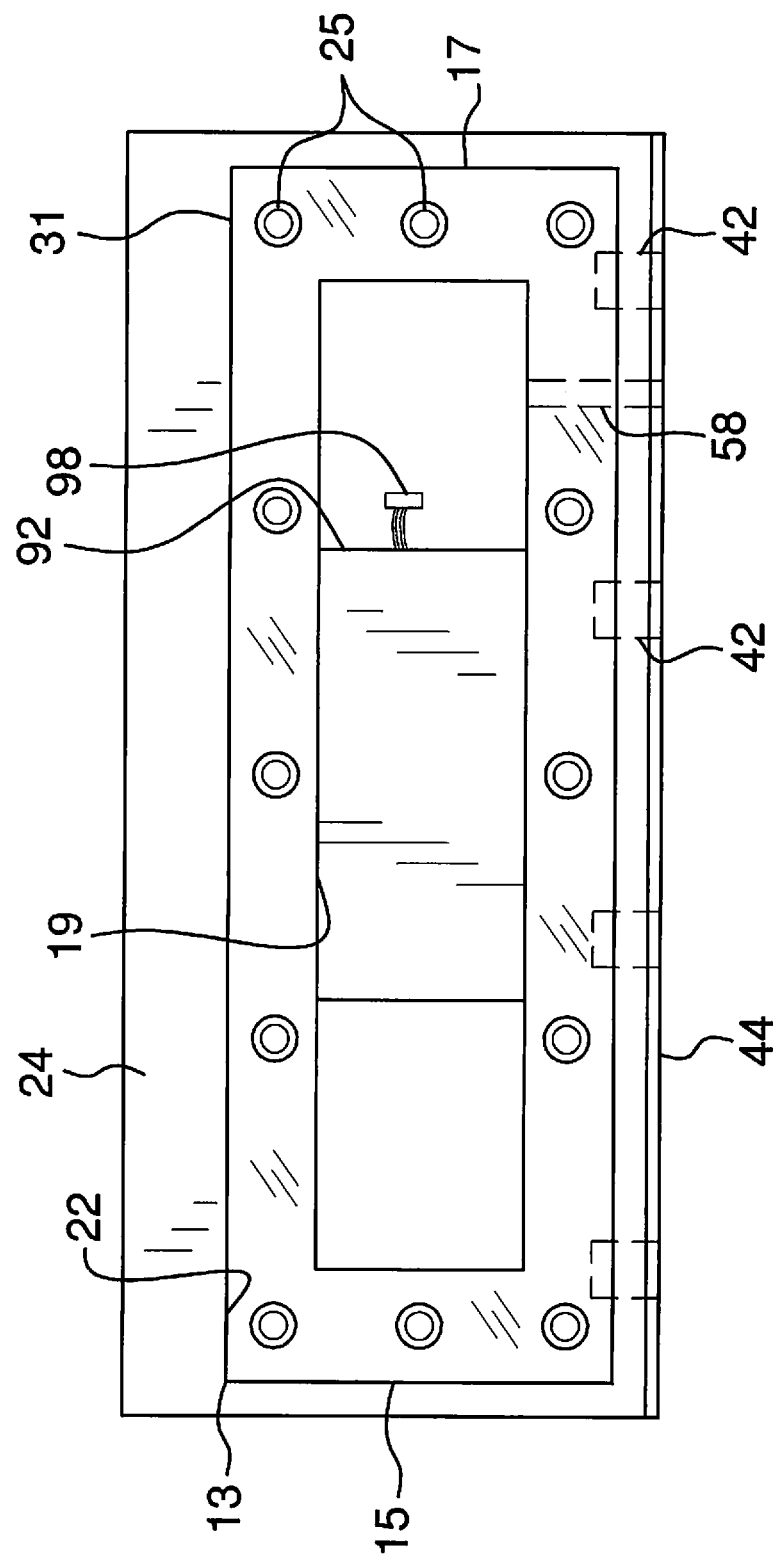
FIG. 5 is a bottom view of an embodiment of the disclosure.
Figure 6:
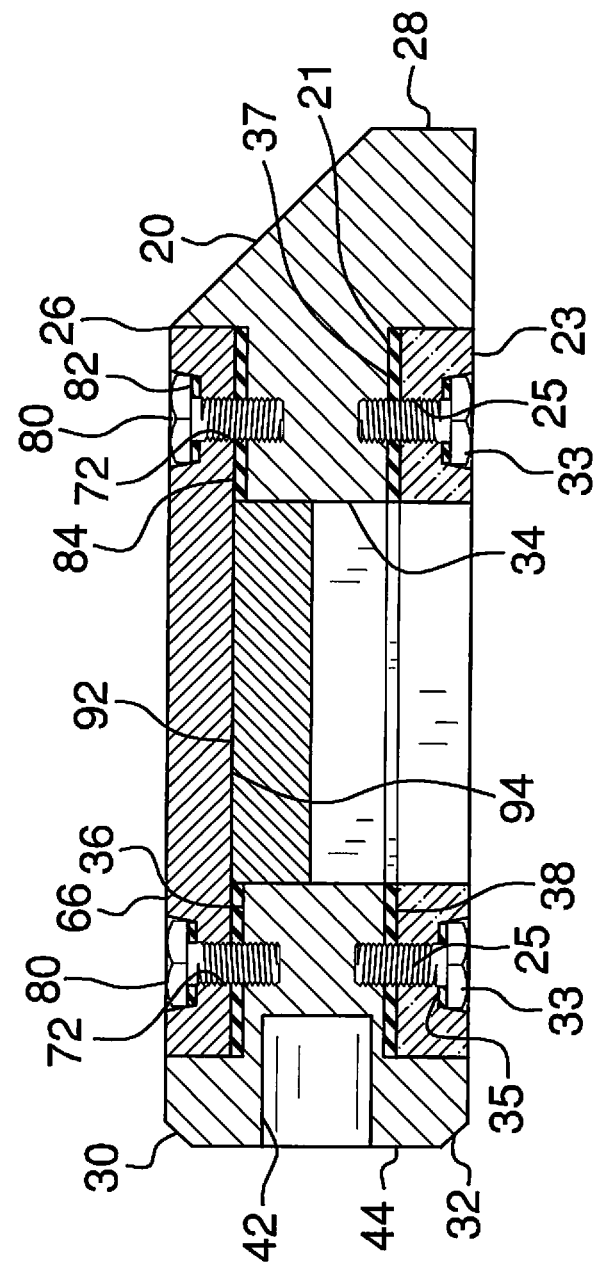
FIG. 6 is a cross sectional view taken along line 6-6 of FIG. 4 of an embodiment of the disclosure.

With reference now to the drawings, and in particular to FIGS. 1 through 6 thereof, a new object detection device embodying the principles and concepts of an embodiment of the disclosure and generally designated by the reference numeral 10 will be described.

As best illustrated in FIGS. 1 through 6, the object detection assembly 10 generally comprises a mount 12 that is elongated along a longitudinal axis extending through a first end 14 and a second end 16 of the mount 12. The mount 12 has a rectangular shape that may have a length between 90 cm and 150 cm, a width between 15 cm and 60 cm and a height between 2 cm and 4 cm. Further, the mount 12 may be comprised of a rigid material such as steel or other similar material. An upper plate slot 18 extends downwardly into a top side 20 of the mount 12. The upper plate slot 18 extends between the first 14 and second 16 ends of the mount 12. A lower plate slot 22 extends upwardly into a bottom side 24 of the mount 12. The lower plate slot 22 extends between the first 14 and second 16 ends of the mount 12.

The upper plate slot 18 may have a width between 10 cm and 55 cm. Additionally, the lower plate slot 22 may have a width between 10 cm and 55 cm. The top side 20 of the mount 12 tapers downwardly between a front edge 26 of the upper plate slot 18 and a front side 28 of the mount 12. Each of a top rear edge 30 and a bottom rear edge 32 of the mount 12 are chamfered. Continuing, a rectangular transceiver aperture 34 extends through a bottom side 36 of the upper plate slot 18 and an upper side 38 of the lower plate slot 22. The rectangular transceiver aperture 34 extends between the first 14 and second 16 ends of the mount 12. Moreover, the rectangular transceiver aperture 34 may have a length between 70 cm and 130 cm and a width between 8 cm and 53 cm.

A pin well 42 extends into a back side 44 of the mount 12. The pin well 42 is one of a plurality of the pin wells 42 that are evenly distributed between the first 14 and second 16 ends of the mount 12. Moreover, the plurality of pin wells 42 each insertably receives an associated one of a plurality of pins 46 coupled to and extending forwardly from a bottom edge 48 of an excavator bucket 50. The mount 12 is coupled to the excavator bucket 50 so the front side 26 of the mount 12 engages Earth when the excavator bucket 50 excavates Earth.

A conduit 52 is coupled to the excavator bucket 50. The conduit 52 extends between the bottom edge 48 of the excavator bucket 50 and a top edge 54 of the excavator bucket 50. Further, a conductor 56 is positioned within the conduit 52. A conduit aperture 58 extends through the back side 44 of the mount 12 and a back edge 62 of the rectangular transceiver aperture 34. A first electrical coupler 64 is coupled to the mount 12 so the first electrical coupler 64 is positioned within the conduit aperture 58. Lastly, the first electrical coupler 64 is electrically coupled to the conductor 56 when the mount 12 is coupled to the excavator bucket 50.

An upper plate 66 is elongated along a longitudinal axis extending through a first end 68 and a second end 70 of the upper plate 66. The upper plate 66 has a rectangular shape that may have a length between 90 cm and 150 cm and a width between 10 cm and 55 cm. Further, the upper plate 66 is positionable in the upper plate slot 18 so the upper plate 66 is coextensive with the upper plate slot 18. A fastener aperture 72 extends through a top side 74 and a bottom side 76 of the upper plate 66 proximate an outer edge 78 of the upper plate 66. The fastener aperture 72 is one of a plurality of the fastener apertures 76 that is evenly distributed around an entire perimeter of the upper plate 66.

A plurality of upper fasteners 80 extends through each of the plurality of fastener apertures 72 in the upper plate 66. The plurality of upper fasteners 80 engages the bottom side 36 of the upper plate slot 18 so the upper plate 66 is retained in the upper plate slot 18. An upper fastener gasket 82 is positioned around each of the plurality of upper fasteners 80. Additionally, an upper gasket 84 is provided. Further, an opening 86 extends through a top side 88 and a bottom side 90 of the upper gasket 84. The upper gasket 84 is positioned between the upper plate 66 and the upper plate slot 18 so the opening 86 in the upper gasket 84 is aligned with the rectangular transceiver aperture 34.

A transceiver 92 is coupled to the bottom side 76 of the upper plate 66. The transceiver 92 is positioned within the rectangular transceiver aperture 34 when the upper plate 66 is positioned within an upper plate slot 18. Moreover, the transceiver 92 may detect an object 96 when the excavator bucket 50 excavates Earth. The object 96 may be a pipe or other object 96 that excavator bucket 50 is required to avoid. Lastly, the transceiver 92 may be a ground penetrating radar transceiver of any conventional design.

A second electrical coupler 98 is electrically coupled to the transceiver 92. The second electrical coupler 98 is electrically coupled to the first electrical coupler 64 so the transceiver 92 is electrically coupled to the conductor 56. Moreover, the transceiver 92 is operationally coupled to a vehicle 11 so the transceiver 92 alerts a driver of the vehicle 11 to the presence of the object 96. The vehicle 11 may be an excavator of any conventional design.

A lower plate 13 is elongated along a longitudinal axis extending through a first end 15 and a second end 17 of the lower plate 13. The lower plate 13 has a rectangular shape that may have a length between 90 cm and 150 cm and a width between 10 cm and 55 cm. Further, the lower plate 13 is positionable in the lower plate slot 22 so the lower plate 13 is coextensive with the lower plate slot 22. A rectangular opening 19 extends through a top side 21 and a bottom side 23 of the lower plate 13. The rectangular opening 19 is aligned with the rectangular transceiver aperture 34 when the lower plate 13 is positioned in the lower plate slot 22. Lastly, the lower plate 13 may be comprised of a rigid and translucent material such as Plexiglass or other similar material.

A fastener aperture 25 extends through the top side 21 and the bottom side 23 of the lower plate 13 proximate an outer edge 31 of the lower plate 13. The fastener aperture 25 is one of a plurality of the fastener apertures 25 that is evenly distributed around an entire perimeter of the lower plate 13. A plurality of lower fasteners 33 extends through each of the plurality of fastener apertures 25 in the lower plate 13. The plurality of lower fasteners 33 engages the upper side 38 of the lower plate slot 22 so the lower plate 13 is retained in the lower plate slot 22.

A lower fastener gasket 35 is positioned around each of the plurality of lower fasteners 33. Additionally, a lower gasket 37 is provided. Further, an opening 39 extends through a top side 41 and a bottom side 43 of the lower gasket 37. The lower gasket 37 is positioned between the lower plate 13 and the lower plate slot 22 so the opening 39 in the lower gasket 37 is aligned with the rectangular transceiver aperture 34.

In use, the transceiver 92 transmits a signal while the excavator bucket 50 excavates Earth. If the transceiver 92 detects the object 96, the operator of the vehicle 11 is notified of the presence of the object 96. The transceiver 92 allows the operator of the vehicle 11 to excavate Earth without contacting the object 96. Moreover, the excavator bucket 50 may be used with or without the transceiver 92 being actuated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An object detection assembly for remotely sensing an underground object, said assembly comprising:
    a mount operationally coupled to an excavator bucket, said mount being elongated along a longitudinal axis extending through a first end and a second end of said mount wherein said mount has a rectangular shape;
    an upper plate coupled to said mount;
    a transceiver coupled to said upper plate wherein said transceiver is configured to detect an object when the excavator bucket excavates Earth, said transceiver being operationally coupled to a vehicle wherein said transceiver alerts a driver of the vehicle to the presence of the object; and
    a lower plate coupled to said mount;
    a rectangular transceiver aperture extending through a bottom side of an upper plate slot and an upper side of a lower plate slot wherein said rectangular transceiver aperture extends between a first end and a second end of said mount; and
    a plurality of pin wells being evenly distributed between a first end and a second end of said mount, each pin well extending into a back side of said mount; said transceiver being coupled to a bottom side of said upper plate wherein said transceiver is positioned within said rectangular transceiver aperture when said upper plate is positioned within said upper plate slot.

2. The assembly according to claim 1 further comprising said upper plate slot extending downwardly into a top side of said mount wherein said upper plate slot extends between a first end and a second end of said mount.

3. The assembly according to claim 1 further comprising said lower plate slot extending upwardly into a bottom side of said mount wherein said lower plate slot extends between a first end and a second end of said mount.

4. The assembly according to claim 1 further comprising said plurality of pin wells each insertably receiving an associated one of a plurality of pins coupled to and extending forwardly from a bottom edge of the excavator bucket wherein said mount is coupled to the excavator bucket.

5. The assembly according to claim 1 further comprising said upper plate being elongated along a longitudinal axis extending through a first end and a second end of said upper plate wherein said upper plate has a rectangular shape.

6. The assembly according to claim 1 further comprising:
    a fastener aperture extending through a top side and a bottom side of said upper plate proximate an outer edge of said upper plate; and
    said fastener aperture being one of a plurality of said fastener apertures being evenly distributed around an entire perimeter of said upper plate.

7. The assembly according to claim 1 further comprising said upper plate being positionable in said upper plate slot wherein said upper plate is coextensive with said upper plate slot.

8. The assembly according to claim 1 further comprising said lower plate being elongated along a longitudinal axis extending through a first end and a second end of said lower plate wherein said lower plate has a rectangular shape.

9. The assembly according to claim 1 further comprising said lower plate being positionable in said lower plate slot wherein said lower plate is coextensive with said lower plate slot.

10. The assembly according to claim 1 further comprising a rectangular opening extending through a top side and a bottom side of said lower plate wherein said rectangular opening is aligned with said rectangular transceiver aperture when said lower plate is positioned in said lower plate slot.

11. The assembly according to claim 1 further comprising:
- a fastener aperture extending through a top side and a bottom side of said lower plate proximate an outer edge of said upper plate; and
- said fastener aperture being one of a plurality of said fastener apertures being evenly distributed around an entire perimeter of said lower plate.

12. An object detection assembly for remotely sensing an underground object, said assembly comprising:
- a mount being elongated along a longitudinal axis extending through a first end and a second end of said mount wherein said mount has a rectangular shape;
- an upper plate slot extending downwardly into a top side of said mount wherein said upper plate slot extends between said first and second ends of said mount;
- a lower plate slot extending upwardly into a bottom side of said mount wherein said lower plate slot extends between said first and second ends of said mount;
- a rectangular transceiver aperture extending through a bottom side of said upper plate slot and an upper side of said lower plate slot wherein said rectangular transceiver aperture extends between said first and second ends of said mount;
- a pin well extending into a back side of said mount, said pin well being one of a plurality of said pin wells being evenly distributed between said first and second ends of said mount, said plurality of pin wells each insertably receiving an associated one of a plurality of pins coupled to and extending forwardly from a bottom edge of an excavator bucket wherein said mount is coupled to the excavator bucket;
- an upper plate being elongated along a longitudinal axis extending through a first end and a second end of said upper plate wherein said upper plate has a rectangular shape, said upper plate being positionable in said upper plate slot wherein said upper plate is coextensive with said upper plate slot;
- a fastener aperture extending through a top side and a bottom side of said upper plate proximate an outer edge of said upper plate, said fastener aperture being one of a plurality of said fastener apertures being evenly distributed around an entire perimeter of said upper plate;
- a transceiver coupled to a bottom side of said upper plate wherein said transceiver is positioned within said rectangular transceiver aperture when said upper plate is positioned within an upper plate slot wherein said transceiver is configured to detect an object when the excavator bucket excavates Earth, said transceiver being operationally coupled to a vehicle wherein said transceiver alerts a driver of the vehicle to the presence of the object; and
- a lower plate being elongated along a longitudinal axis extending through a first end and a second end of said lower plate wherein said lower plate has a rectangular shape, said lower plate being positionable in said lower plate slot wherein said lower plate is coextensive with said lower plate slot; and
- a rectangular opening extending through a top side and a bottom side of said lower plate wherein said rectangular opening is aligned with said rectangular transceiver aperture when said lower plate is positioned in said lower plate slot.

* * * * *